April 2, 1968

D. A. CARLSON 3,376,493

INVERTER CIRCUIT HAVING IMPROVED CONTROL FREQUENCY
COMPENSATING MEANS FOR PRODUCING A
REGULATED A.C. OUTPUT

Filed Sept. 16, 1963

INVENTOR.
Donald Carlson
BY
Pendleton, Neuman,
Seibold & Williams
Atty's

INVENTOR.
Donald Carlson
BY
Pendleton, Neuman,
Seibold & Williams
Attys

United States Patent Office 3,376,493
Patented Apr. 2, 1968

3,376,493
INVERTER CIRCUIT HAVING IMPROVED CONTROL FREQUENCY COMPENSATING MEANS FOR PRODUCING A REGULATED A.C. OUTPUT
Donald A. Carlson, Skokie, Ill., assignor to Basic Products Corporation, Milwaukee, Wis., a corporation of Wisconsin
Filed Sept. 16, 1963, Ser. No. 309,188
10 Claims. (Cl. 321—45)

ABSTRACT OF THE DISCLOSURE

A solid state inverter circuit having a synchronizing oscillator for stabilizing the controlling frequency of a pulse generator including a flip-flop circuit which, in turn, controls a firing of solid state controlled rectifiers, and having an auxiliary frequency characteristic circuit for causing an increase in the pulse generator frequency during a starting interval, and having a substantially sinusoidal wave form output.

---

Figure 1:
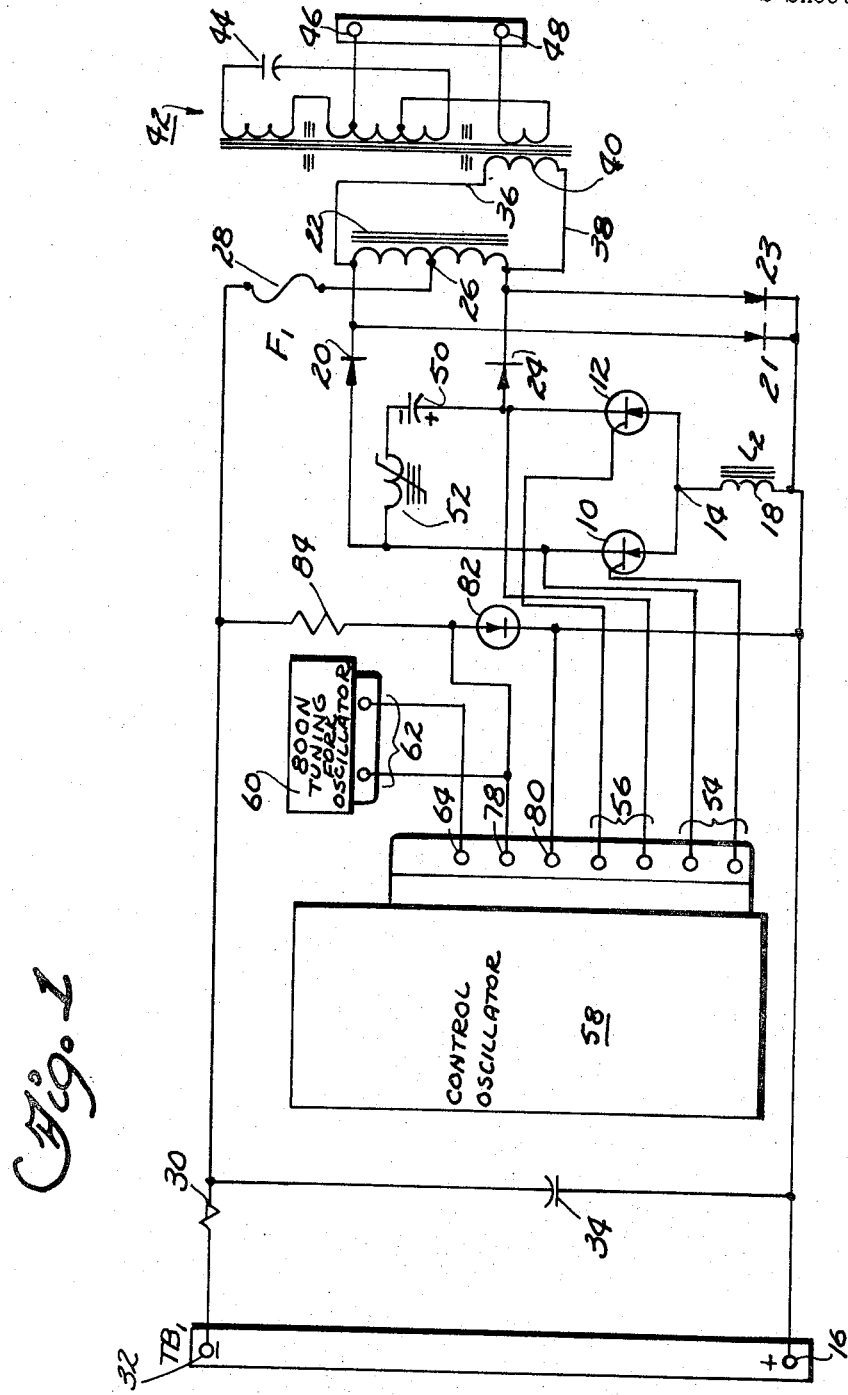

This invention relates to inverters and more particularly to inverters employing silicon controlled rectifiers for producing a sinusoidal output signal from a D.C. source.

Inverters are useful in environments where there is a source of direct current available, but an alternating current, or a direct current of a different voltage, is required. One such application for inverters is in space vehicles where the only available long-term source of power is direct current produced by solar batteries or the like.

In inverter circuits, it is desirable for the inverter to consume as little power as possible so that a maximum amount of input power is converted into the alternating output signal. Silicon controlled rectifiers (or SCR's) are ideally suited for use in inverters, because they consume very little power and are capable of switching large currents.

Inverters employing SCR's are most efficient when the SCR's are driven so as to produce a square wave. However, the desired alternating current output is most useful in a sinusoidal waveform. Accordingly, the novel inverter of the present invention is provided with means for deriving a sinusoidal output waveform from a square wave produced by the SCR's.

The operation of an SCR is such that when it is to be rendered nonconductive, after first being rendered conductive, a reverse potential must be applied momentarily to it to cause carriers to diffuse out of the end junctions of the SCR before it assumes its blocking condition. This has been accomplished in the prior art by the use of a commutating capacitor connected across the output, which capacitor is adapted to apply a momentary reverse potential to the SCR when it is to be cut off. When the SCR's are operated in their most efficient square wave mode, however, some of the charge placed on the commutating capacitor leaks off in the operation of prior art circuits, and is therefore not available to help cut off the conducting SCR. In the inverter of the present invention, means is provided to cause the commutating capacitor to retain the peak voltage impressed across it.

In the operation of the inverter, the commutating capacitor is oppositely charged during opposite half cycles of the conduction of the SCR's. When the commutating capacitor is connected directly across the inductance of an output transformer, as is the case in the prior art, an excessive charging current flows through the capacitor during the initial part of each half cycle, which current is shunted away from the output where it is needed. Accordingly, in the present invention, means is provided for limiting the rate of current flow through the capacitor without substantially decreasing the amount of charge which is placed on the capacitor during each half cycle of operation.

The most efficient mode of operation for the SCR's demands that the input waveform which causes the SCR's to switch from their blocking condition to their conductive condition have a relatively steep wave front. It is therefore desirable to provide an oscillator adapted to produce a square wave output to cause the SCR's to switch as rapidly as possible. Accordingly, in the inverter of the present invention, there is provided a square wave generator adapted to produce output pulses suitable for effectively driving the SCR inverter circuit.

In the use of inverters, it is normally desirable that the frequency of the alternating output signal be fairly constant, and close to a known frequency. It has accordingly been the practice to provide means for synchronizing the operation of the inverter circuit with a synch oscillator, or a source of A.C. signals having a fairly stable frequency. Tuning fork oscillators are most satisfactory for this purpose. When a tuning fork oscillator is tuned on initially, however, its output frequency increases fairly slowly, and approximately 5 to 10 seconds is required for the frequency of the oscillator to reach its predetermined value. Accordingly, it is necessary to provide means for controlling the frequency of oscillation of the square wave generator during the time that the synch oscillator is coming up to frequency. In the present invention, the square wave generator is provided with independent frequency control means to cause it to oscillate out of synchronism while the tuning fork frequency is coming up to its predetermined value.

It is desirable that the output load of the square wave generator be substantially constant. The simplest way of doing this is by the use of a center tapped transformer which is driven in push-pull by the square wave generator. However, the use of an inductive load in the output tends to render the square wave generator somewhat unstable, and there is a tendency for the generator to oscillate at a harmonic of the synch frequency. Accordingly, in the inverter of the present invention, there is provided means for preventing the square wave generator from oscillating in response to transient conditions in the inductive load.

As the SCR's are fundamentally high current devices, a large current flows through the load which is coupled to the output of the SCR's. This current produces a large amount of heat, which tends to destroy the efficiency of the inverter by increasing the power wasted in the resistance of load. The present invention reduces this effect by employing an autotransformer in the output circuit of the SCR's, whereby the voltage produced at the output of the autotransformer is greater than the D.C. supply voltage, and consequently there is proportionately less current. This reduces heating in the load which is connected to the output of the autotransformer. In addition the use of the autotransformer allows an output transformer without a tapped primary to be used, thereby reducing the cost of the system.

When the load connected to the SCR's is inductive, as is the case when an autotransformer is employed as part of the output circuit, the frequency of oscillations must be maintained at high value, because there is substantially no impedance to current flow through the inductance at low frequency values. Accordingly, there must be means for insuring that the frequency of operation is high, even during the initial portion of operation, when the inverter circuit is first turned on. Moreover, when inductive loads are employed, the first cycle of operation of the inverter may cause current to flow through the inductive load such as to produce a magnetic field in the same direction as the remanence in the inductive load. It is therefore important that during the first part of the initial portion of the inverter operation, the frequency of operation be maintained at a higher value than normal, to prevent an excessive current from flowing during this time. In the inverter of the present invention, there is provided an auxiliary frequency control circuit associated with the square wave generator, to maintain the generated frequency at fairly high value during this portion of the cycle of operation of the inverter.

It is an important object of the present invention to provide an inverter employing a pair of SCR's adapted to produce an alternating current signal from a direct current source of power, and means connected with the SCR's to generate substantially a sinusoidal waveform in response to the alternating current signal produced by the SCR's.

It is another object of the present invention to provide means for synchronizing the operation of the SCR's with the output of an oscillator such as to prevent the frequency of operation of the SCR's from being below a predetermined value during the initial portion of an operating cycle of the inverter.

It is another object to provide means for maintaining the charge on the commutating capacitor at the peak voltage value which is impressed on it during each half cycle.

It is a further object of the present invention to provide means between the output of the SCR's and the load to limit current flow through the load.

It is a further object of the present invention to provide square wave generator means for driving the inverter circuit including means for isolating the output of the square wave generator from the load, and means for preventing oscillation of the square wave generator at an incorrect frequency.

It is another object of the present invention to provide means for limiting the rate of the current flowing through the commutating capacitor.

It is a further object of this invention to provide an improved inverter circuit which is inexpensive and simple in construction.

It is another object of the present invention to provide an improved inverter circuit which has a high efficiency and increased reliability.

These and other objects and advantages of the present invention will become manifest by an examination of this specification, and the accompanying claims and drawings.

In one embodiment of the present invention, there is provided an inverter circuit comprising a pair of SCR's connected in push-pull in relation to an output device, control means for alternately energizing one or the other of the SCR's with switching signals to cause a current to flow through one of the SCR's and in one direction or the other through the output device, and means connected to the output device and adapted to provide a sinusoidal output voltage in response to the current flowing through the output device. The control means for alternately rendering each SCR conductive and nonconductive includes a square wave generator driven by an oscillator having a main frequency control circuit, and an auxiliary frequency control circuit operative when the inverter is initially energized. A controlled frequency source for generating a signal of a constant frequency is applied to synchronize the operation of the square wave generator at a predetermined frequency. The control means is connected with the SCR's by means operative to isolate the oscillator circuit from that of the SCR's. A commutating capacitor is connected between the SCR's in series with current rate-limiting means and serves to alternately extinguish each SCR as the other is rendered conductive. Means operatively associated with the commutating capacitor maintains the capacitor charged to the peak voltage impressed upon it during certain portions of each cycle of operation. An additional current rate-limiting means is employed in series with the conductive circuit through each of the SCR's.

Figure 2:
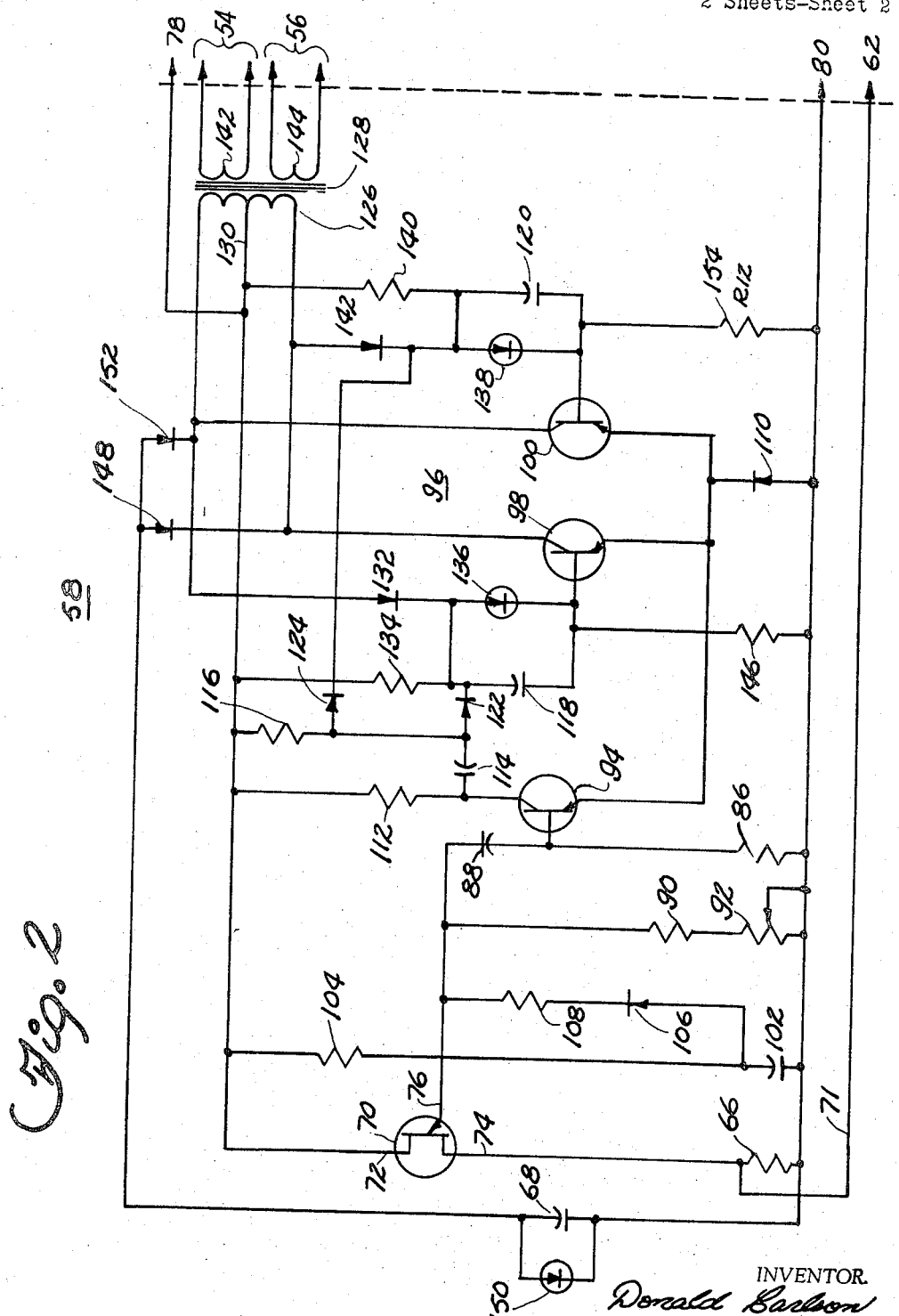

Reference will now be made to the accompanying drawings in which:

FIG. 1 is a schematic diagram of a circuit embodying the present invention, partly in functional block form; and FIG. 2 is a schematic diagram of the control oscillator illustrated in functional block form in FIG. 1.

Referring now to FIG. 1, there is illustrated a pair of SCR's 10 and 12 having a common anode connection at 14, which is connected to a terminal 16 through the inductance 18. A source of positive potential is connected to the terminal 16. The cathode of the SCR 10 is connected through a diode 20 to one end terminal of a center tapped inductance or autotransformer 22, while the cathode of the SCR 12 is connected to the other side of the autotransformer 22 through a diode 24. The autotransformer 22 is provided with a center tap 26 which is connected by a fuse through a circuit breaker 30 to a terminal 32, to which is connected a source of negative potential. A capacitor 34, connected between the source terminals 16 and 32, presents a low impedance for high frequency transients generated by the inverter circuit.

The opposite ends of the autotransformer 22 are connected by lines 36 and 38 to the primary winding 40 of a constant voltage transformer 42, which may be any of a number of such transformers well known in the prior art. One such transformer is disclosed in Patent No. 2,694,177. The constant voltage transformer 42 is preferably provided with a stabilizing circuit including a capacitor 44 which operates to enhance the form factor of the alternating signal produced at the output terminals 46 and 48, by reducing the amplitude of the third harmonic of the signal applied to the primary 40.

The capacitor 50 is connected between the cathodes of the SCR's 10 and 12, and in series with an inductance 52. The capacitor 50 is the commutating capacitor, and operates to extinguish, in turn, each of the SCR's after its conductive phase, as will be more fully described hereinafter. The pair of diodes 20 and 24, in turn, prevent the capacitor from discharging through the winding 26 or the load, and the capacitor 50 therefore maintains a charge equal to the peak impressed voltage for approximately one-half cycle. The SCR's 10 and 12 are controlled by signals appearing at terminals 54 and 56, respectively, which are energized by a control oscillator 58. The control oscillator 58 is synchronized with a predetermined frequency by a tuning fork oscillator 60 which generates a signal on terminals 62, which are connected to the terminals 64 and 78 of the control oscillator.

Terminals 78 and 80 are connected to the anode and the cathode, respectively, of a zener diode 82 connected in series across the supply voltage of the inverter with a resistor 84. The zener diode 82 provides a substantially constant voltage which is independent of variations in voltage at the terminals 16 and 32.

The control oscillator 58 produces signals on terminals 54 and 56 such as to render the SCR's 10 and 12 alternately conducting. Assume, for example, that at a given time the SCR 12 is conducting, and current is flowing from the terminal 16 through the inductance 18 to the anode of the SCR 12, and from the cathode of the SCR 12 through the diode 24 and one half of the autotransformer 22 to its center tap 26. Current also flows through the parallel path through the cathode of the SCR 12 through the capacitor 50, the inductance 52, and the diode 20 through the other half of the autotransformer 22 to its center tap 26. This latter current charges the commutating capacitor 50 in the polarity indicated in FIG. 1.

Now if a pulse is applied to the terminals 54 such as to render the SCR 10 conducting, current flows through the inductance 18 to the anode of the SCR 10 and from its cathode through the diode 20 and the upper half of the autotransformer 22 to its center tap 26.

When the SCR 10 is rendered conductive, its cathode is at substantially the same potential as its anode, and so the commutating capacitor 50 applies a reverse potential across the SCR 12 to extinguish it. A short pulse of current flows in the reverse direction through the SCR 12, after which it becomes nonconductive, and the remainder of the charge upon the commutating capacitor 50 is discharged through the diodes 24 and 23. The commutating capacitor 50 is prevented from discharging through the output, by the reverse poled diode 20. The SCR 10, having been driven into conduction and the SCR 12 extinguished, this condition is maintained until a succeeding signal is received at the terminals 56, upon which the above described opeartion is repeated and the state of condition of SCR's is reversed.

Referring now to FIG. 2, a schematic diagram of the control oscillator 58 is illustrated. The terminal 62 which communicates with the tuning fork oscillator, is connected with an oscillator circuit including a unijunction transistor 70 by a line 71.

The active element of the control oscillator is the unijunction transistor 70, which has first and second base terminals 72 and 74, respectively, and an emitter terminal 76. The first base terminal 72 is connected to the negative terminal 78.

The positive terminal 80 is connected to the second base 74 through the resistor 66 and establishes an innerbase potential between the bases 72 and 74. This potential is modified by the signal from the tuning fork oscillator present at the terminal 62, thus to apply a synchronizing signal to the unijunction transistor 70.

The frequency control elements of the unijunction oscillator include a resistor 86 and a capacitor 88 connected in series between the positive terminal 80 and the emitter terminal 76 of the transistor 70. A resistor 90 and a rheostat 92 are series connected in parallel with the RC circuit including the resistor 86 and the capacitor 88.

In operation, a current flows from the positive terminal 80 through the resistor 86 and the capacitor 88 to the emitter 76 of the transistor 70, and from its first base to the negative terminal 78. This current charges the capacitor 88, and causes the potential of the emitter terminal 76 to drop below the voltage required for conduction of the transistor 70, whereby the unijunction transistor 70 ceases conducting. At this point, the capacitor 88 is charged in the polarity illustrated in FIG. 2, and begins to discharge through the loop formed by the resistors 86, 90 and 92, thereby raising the potential at the emitter terminal 76. When the emitter voltage has been raised sufficiently to again drive the unijunction transistor 70 into conduction, the operation cycle is repeated, and the capacitor 88 is again charged in the porality indicated in FIG. 2 to extinguish the transistor 70. As the unijunction transistor 70 has a negative resistance characteristic its cut off voltage, after conduction has started, is substantially lower than the voltage required to initiate its conduction. The circuit therefore oscillates at a frequency depending upon the time constant of the charging and discharging circuits associated with the capacitor 88. It is evident that the time constant for the charging circuit is shorter than that for the discharging circuit, and the charging of the capacitor 88 therefore produces relatively steep negative going pulses at the junction of the resistor 86 and the capacitor 88 at the instant that the unijunction transistor 70 is driven into conduction. This pulse is applied to the base of transistor 94, and serves to alternately change the state of a flip-flop 96 including transistors 98 and 100.

The frequency of the oscillation of the unijunction transistor oscillator may be varied by adjusting the position of the tap of the rheostat 92, which controls the time constant of the discharge circuit. The natural frequency of the circuitry including capacitor 88 is designed to be slightly lower than the frequency applied by the tuning fork oscillator to the terminal 62, thereby facilitating the synchronizing function.

When the tuning fork oscillator 60 is first turned on, it takes a relatively long time to increase the frequency of its oscillations to the desired frequency, and this extends over a period of from 5 to 10 seconds. The frequency controlling elements of the unijunction oscillator control the frequency of the oscillator during this interval. In view of the fact that the output of the inverter is an inductive load represented by the autotransformer 22 and the constant voltage transformer 42, excessive currents will be drawn by the SCR's 10 and 12 during initial operation of the inverter if the frequency is permitted to start off at a low value. This causes the fuse 28 to blow, and detracts from the utility of the circuit. Accordingly, there is provided an auxiliary frequency control circuit in the unijunction oscillator 70 for increasing the initial frequency of the unijunction oscillator to prevent excessive currents from flowing through the SCR's.

The auxiliary frequency control comprises a capacitor 102 and a series resistor 104 connected between the positive and negative terminals 80 and 78 and a circuit connected from the junction of the capacitor 102 and the resistor 104 to the emitter terminal 76 of the unijunction transistor 70 including a diode 106 and a series resistor 108. When the apparatus is initially turned on, the capacitor 102 has substantially no charge, and is charged slowly to the potential between the terminals 78 and 80 through the relatively large resistor 104. During the time that it is charging, however, an additional discharge circuit is provided for the capacitor 88, in parallel with the normal discharge circuit which includes the resistor 90 and the rheostat 92. Thus, when the capacitor 88 is charged in the indicated polarity, an additional discharge current flows through the resistor 86, the capacitor 102, the diode 106 and the resistor 108, thus reducing the time constant of the discharge circuit during an initial portion of operation of the inverter. After the capacitor 102 becomes fully charged through the resistor 104, the diode 106 becomes back biased and, therefore, nonconductive, effectively taking the additional discharge path out of the circuit. The auxiliary circuit including the capacitor 102 therefore increases the frequency of the unijunction transistor oscillator only during its initial operating period, in order to limit current flowing through the output inductance, and the drops out of the circuit.

As has been noted above, a negative pulse is applied to the base of the transistor 94 during each cycle of oscillation of the unijunction transistor oscillator. The emitter of the transistor 94 is connected to the positive source terminal 80 through an emitter bias diode 110, and its collector is connected to the negative source terminal 78 through a resistor 112. The negative pulse applied to the base of the transistor 94 renders it conductive, thereby producing a positive going pulse at its collector which is differentiated by a circuit including a capacitor 114 and a resistor 116, and passed through diodes 122 and 124 to the inputs of the flip-flop 96.

The flip-flop 96 is of the complementing type, and the differentiated pulse from the transistor 94 is applied to the bases of each of the transistors 98 and 100 through capacitors 118 and 120, respectively. The diode 112 is connected in series between the capacitors 114 and 118, and the diode 124 is connected in series between the capacitors 114 and 120. The emitters of each of the transistors 98 and 100 are connected in common to the cathode of the emitter bias diode 110, and the collectors are connected to opposite terminals of the primary winding 126 of an output transformer 128. A center tap 130 of the transformer 128 is connected to the negative terminal 78.

Assume that at a given time the transistor 100 is conducting, such that current flows from the collector of the transistor 100 through the upper half of the primary winding 126 of the transformer 128. Current also flows from the collector of the transistor 100 through a diode 132 and a resistor 134 to the negative terminal 78, thereby producing a relatively positive voltage at the junction of the diode 132 and the resistor 134. This positive voltage is applied to the base of the transistor 98 through a zener diode 136, in parallel with the capacitor 118, such as to maintain the transistor 98 nonconducting. Base current flows from the transistor 100 through the capacitor 120 and through a zener diode 138 in parallel therewith, and thence through a series resistor 140 to the negative potential source 78. The capacitor 120 is charged by the base current in the polarity indicated in FIG. 2, to a potential equal to the zener voltage of the diode 138. The capacitor 118 is substantially uncharged, because one end is connected to the positive terminal 80 through a resistor 146, and the other end is also at an elevated potential because of current flowing through the resistor 134 from the collector of the transistor 100.

If a positive pulse is now applied to the flip-flop from the collector of the transistor 94, the pulse is applied to the bases of both of the transistors 98 and 100, and operates to cut off the transistor 100. This reduces the current flow through the resistor 134 sharply, thereby producing a negative pulse which passes through the capacitor 118 to the base of the transistor 98, to drive the transistor 98 into conduction. A collector current then flows from the transistor 98 through the lower half of the primary winding 126 of the transformer 128, and also through a diode 142 and a series connected resistor 140 to establish a positive potential at the junction of the diode 142 and the resistor 140, which potential is applied to the base of the transistor 100 through the capacitor 120, thereby maintaining the transistor 100 cut off. The capacitor 120 then gradually discharges through the resistor 154, until the base of the transistor 100 is at the potential of the positive terminal 80. The transistor 100 remains cut off, however, because of the voltage drop through the emitter bias diode 110.

The transistor 98 is maintained conductive by the base current flowing through the capacitor 118 and its parallel connected zener diode 136 and series connected resistor 134, to the negative terminal 78.

Thus, once during each cycle of oscillation of the unijunction transistor oscillator, the flip-flop 96 is caused to change its state and to alternately apply oppositely directed currents through respective halves of the primary winding 126 of the transformer 128. As the flip-flop 96 represents a frequency divider of the order of two, the frequency applied to the primary transformer 128 is one-half that of the frequency of the tuning fork oscillator.

The transformer 128 is provided with two secondary windings 142 and 144, which are respectively connected to the terminals 54 and 56, and control the SCR's 10 and 12 as shown in FIG. 2.

As has been indicated above, when the flip-flop is provided with a center tap output transformer, there is a tendency for the flip-flop to oscillate independently of its input pulses, and thus have an unstable operation, as opposed to the desired bistable operation. This is undesirable both because the output frequency of the inverter is not proper, and also because the output of an oscillating flip-flop approaches a sinusoidal waveform, for which the inverter is not as efficient.

The mechanism by which a flip-flop may tend to oscillate is associated with the autotransformer action of the primary 126 of the transformer 128, which tends to generate a spurious voltage which may cause premature switching of the flip-flop.

Thus, after an interval in which the transistor 100 is conducting, an input pulse cuts off the transistor 100, and the transistor 98 conducts through the lower half of the primary winding 126 of the output transformer 128, the current flowing through the primary 126 reversing its direction. The sudden reversal of the direction of current flow in the primary 126 produces a relatively large voltage drop across the lower half of the primary 126, and a voltage is induced in the upper half by autotransformer action which places a greatly reduced potential at the anode of the diode 132. After the switching transient has died out, there is much less voltage drop across the lower half of primary winding 126, and the potential at each end of the primary 126 moves toward the voltage level at the negative terminal 78.

Were it not for the diode 132 in the feed-back circuitry of the flip-flop, the upper end of the primary winding 126 of the output transformed 128 would apply a negative voltage to the input circuit associated with the base of the transistor 98. This would charge the capacitor 118 through a resistor 146 connected between the base of the transistor 98 and the positive terminal 80, and, after the transient in the primary winding 126, the potential of the upper end of the primary winding would rise toward the level at the negative terminal 78, and this increased potential added to the charge potential of the capacitor 118 would cut off the transistor 98 causing switching of the state of the flip-flop prematurely. The diode 132 prevents this from occurring with respect to the transistor 98, while the corresponding diode 142 in the circuitry of the other transistor 100 performs a similar function with respect to it.

After the transient, the voltage drop across the lower half of the primary winding 126 is solely attributable to the resistance within the winding. If the voltage drop across the resistor 140 decreases after the transient, by an excessive amount, a negative pulse is generated which is communicated to the base of the transistor 100 by the capacitor 120, and tends to trigger the transistor 100 into conduction, thereby prematurely switching the state of the flip-flop. This is prevented by a clamping circuit including a pair of diodes 148 and 152, which prevent the voltage at opposite ends of the primary winding 126 from falling below a predetermined value. The predetermined voltage value is determined by a zener diode 150 connected in parallel with a capacitor 68 between the diodes 148 and 152 and the positive terminal 80. In operation, the zener diode 150 conducts a sufficient amount of current to maintain the opposite ends of the primary winding 126 at the predetermined potential. The resistors 146 and 154, which operate to discharge the capacitors 118 and 120 when their respective transistors are cut off, are made relatively large so that the capacitors may not discharge during the transient generated by the primary 126.

Accordingly, the flip-flop 96 is prevented from oscillating by the provision of the diodes 132 and 142 in the feed-back circuits, and also by the clamping circuit including the diodes 148 and 152. It is therefore possible to use an output transformer having a center tapped primary without danger of having the flip-flop oscillate.

In an exemplary embodiment of the present invention some of the components employed in the control oscillater are:

| | | |
|---|---|---|
| 66 | ohms | 470 |
| 70 | | 2N1671A |
| 86 | ohms | 1000 |
| 88 | mf | .022 |

| | | |
|---|---|---|
| 90 | ohms | 51K |
| 92 | do | 100K |
| 98 | | 2N525 |
| 100 | | 2N525 |
| 102 | mf | 10 |
| 104 | ohms | 22K |
| 106 | | 1N625 |
| 108 | ohms | 68K |
| 110 | | HR1A |
| 112 | ohms | 27K |
| 116 | do | 4.7K |
| 118 | mf | 5 |
| 120 | do | 5 |
| 122 | | 1N283 |
| 124 | | 1N283 |
| 132 | | 1N283 |
| 134 | ohms | 470 |
| 136 | | 1N752 |
| 138 | | 1N752 |
| 140 | ohms | 470 |
| 142 | | 1N283 |
| 146 | ohms | 2.2K |
| 154 | do | 2.2K |

What is claimed is:

1. In an inverter having a source of D.C. potential, a pair of output terminals, and switch means for interconnecting said source with said output terminals, the combination comprising an A.C. generator for supplying an A.C. signal to control the operation of said switch means, said generator including a flip-flop, transformer means having a center tapped primary connected to the output of said flip-flop and secondary winding means connected to said switch means, said flip-flop having cross coupled feed-back circuits each including a unidirectional conducting device to prevent transients of said primary from influencing the state of said flip-flop.

2. An inverter comprising a pulse generator, a synch oscillator connected to said pulse generator for synchronizing its operation with a predetermined frequency, a bistable device connected to said pulse generator for deriving a pair of square wave signals 180° out of phase with each other, a pair of output terminals, impedance means connecting each of said output terminals with a first terminal, switch means comprising a pair of semiconductor devices connected in push-pull relationship with said output terminals, and a source of D.C. potential connected between said first terminal and a second terminal common to each of said semiconductive devices; said bistable device comprising first and second semiconductor devices each having an anode, a cathode and a control terminal for controlling the conductivity between said anode and cathode, an output transformer having a center tapped primary winding, the cathodes each of said semiconductor devices being connected to opposite ends of said primary winding, said center tap being connected to a relatively negative potential, said anodes being connected to a source of relatively positive potential, an input circuit for each of said semiconductor devices comprising a parallelly connected capacitor and zener diode, feedback means comprising a pair of unidirectional conducting devices cross coupled between the cathodes of each of said semiconductor devices and the input circuit associated with the other semiconductor device, impedance means connected between each of said input circuits and said reference potential, impedance means connected between the control terminal of each of said semiconductor devices and said positive source, and clamping means comprising a pair of unidirectional conducting devices connected between said positive potential and said ends of said primary winding.

3. An inverter comprising a pulse generator, a synch oscillator connected to said pulse generator for synchronizing its operation with a predetermined frequency, bistable means connected to said pulse generator for deriving a pair of square wave signals 180° out of phase with each other, a pair of output terminals, impedance means connecting each of said output terminals with a first terminal, switch means comprising a pair of semiconductor devices connected in push-pull relationship with said output terminals, and a source of D.C. potential connected between said first terminal and a second terminal common to each of said semiconductor devices; said bistable means comprising a complementing flip-flop having its input connected to the output of said pulse generator, said flip-flop comprising a pair of semiconductor devices each connected to an opposite end terminal of a center tapped inductance, clamping means for connecting each of said end terminals to a reference voltage, and a pair of feedback means each connected between one of said end terminal and the control terminal of the semiconductor device associated with the opposite end terminal.

4. Apparatus according to claim 3, wherein each of said feed-back means comprises a unidirectional current conducting device.

5. An inverter comprising a pulse generator, a synch oscillator connected to said pulse generator for synchronizing its operation with a predetermined frequency, bistable means connected to said pulse generator for deriving a pair of square wave signals 180° out of phase with each other, a pair of output terminals, impedance means connecting each of said output terminals with a first terminal, switch means comprising a pair of semiconductor devices connected in push-pull relationship with said output terminals, and a source of D.C. potential connected between said first terminal and a second terminal common to each of said semiconductor devices; said pulse generator comprising an RC oscillator having a normal frequency of oscillation below said predetermined frequency, said oscillator including a unijunction transistor having its first base connected to a relatively negative potential and its second base connected through impedance means to a relatively positive potential, means for applying a synchronizing signal between said first and second bases, and a frequency control circuit connected between the emitter of said unijunction transistor and said positive potential, said frequency control circuit comprising a first capacitor connected in series with a first resistor, a second resistor connected in parallel with said first capacitor and said first resistor, a diode connected in series with a second capacitor and a third resistor, said diode, second capacitor and third resistor being in parallel with said second resistor, one end of said second capacitor being connected to said positive potential, the other end of said capacitor being connected through a fourth resistor to said negative potential, whereby said unijunction transistor, when conductive, charges said first capacitor through said first resistor, and said first capacitor discharges through said first and second resistors, said first capacitor also discharging through said second capacitor only during a first interval, the end of said first interval being determined by the time constant of the circuit including said second capacitor and fourth resistor.

6. An inverter comprising a pulse generator, a synch oscillator connected to said pulse generator for synchronizing its operation with a predetermined frequency, bistable means connected to said pulse generator for deriving a pair of square wave signals 180° out of phase with each other, a pair of output terminals, impedance means connecting each of said output terminals with a first terminal, switch means comprising a pair of semiconductor devices connected in push-pull relationship with said output terminals, and a source of D.C. potential connected between said first terminal and a second terminal common to each of said semiconductor devices; said pulse generator comprising an RC oscillator having a normal frequency of oscillation below said predetermined frequency, said RC oscillator comprising a relaxation oscillator having an active element with a negative resistance characteristic and frequency control means connected with said active element including a first capacitor, first circuit means for charging said capacitor, and second circuit means for discharging said capacitor, said active element being responsive to the charge placed upon said capacitor for conducting while said capacitor is charging and for being nonconductive while said capacitor is discharging.

7. Apparatus according to claim 6 including an auxiliary timing circuit comprising a second capacitor, means for charging said second capacitor and unidirectional conducting means interconnecting said second capacitor with said first capacitor in said frequency control circuit, said second capacitor and said unidirectional conducting device being connected in parallel with said second circuit means to decrease the time constant of said second circuit means during the time in which said second capacitor is being charged by its charging means.

8. An inverter comprising a pulse generator, a synch oscillator connected to said pulse generator for synchronizing its operation with a predetermined frequency, bistable means connected to said pulse generator for deriving a pair of square wave signals 180° out of phase with each other, a pair of output terminals, impedance means connecting each of said output terminals with a first terminal, switch means comprising a pair of semiconductor devices connected in push-pull relationship with said output terminals, and a source of D.C. potential connected between said first terminal and a second terminal common to each of said semiconductor devices; said semiconductor devices each including an anode, a cathode and a control terminal for controlling the conductivity between anode and cathode, said anodes each being connected to said second terminal, and said impedance means comprising an inductance, the opposite ends of said inductance being connected to each of said output terminals and to the cathodes of said semiconductor devices, said inductance having a center tap connected to said first terminal, and including unidirectional conducting means connected between each of said output terminals and a predetermined voltage.

9. An inverter comprising a pulse generator, a synch oscillator connected to said pulse generator for synchronizing its operation with a predetermined frequency, bistable means connected to said pulse generator for deriving a pair of square wave signals 180° out of phase with each other, a pair of output terminals, impedance means connecting each of said output terminals with a first terminal, switch means comprising a pair of semiconductor devices connected in push-pull relationship with said output terminals, and a source of D.C. potential connected between said first terminal and a second terminal common to each of said semiconductor devices; said semiconductor devices each including an anode, a cathode and a control terminal for controlling the conductivity between anode and cathode, said anodes each being connected to said second terminal, and said impedance means comprising an inductance, the opposite ends of said inductance being connected to each of said output terminals and to the cathodes of said semiconductor devices, said inductance having a center tap connected to said first terminal, and including a circuit comprising a series connected inductance and capacitance connected between the cathodes of said semiconductor devices.

10. An inverter comprising a pulse generator, a synch oscillator connected to said pulse generator for synchronizing its operation with a predetermined frequency, bistable means connected to said pulse generator for deriving a pair of square wave signals 180° out of phase with each other, a pair of output terminals, switch means comprising a pair of semiconductor devices connected in push-pull relationship with said output terminals and a source of D.C. potential, said pulse generator includes an auxiliary frequency characteristic circuit for causing said pulse generator to operate at a higher frequency than said predetermined frequency, and a constant voltage transformer having a primary winding connected to said output terminals and a secondary winding for deriving a substantially sinusoidal wave form.

References Cited

UNITED STATES PATENTS

| 3,061,769 | 10/1962 | Smyth | 323—60 XR |
| 3,075,136 | 1/1963 | Jones | 321—43 |
| 3,097,335 | 7/1963 | Schmidt | 321—47 XR |
| 3,176,242 | 3/1965 | Dyer et al. | 331—113 |
| 3,189,845 | 6/1965 | Jones | 321—45 XR |
| 3,248,634 | 4/1966 | Fudaley et al. | 321—45 XR |
| 3,259,827 | 7/1966 | Strohmeier et al. | 321—45 XR |
| 3,264,548 | 8/1966 | King | 321—45 |
| 3,273,046 | 9/1966 | Bedford | 321—45 |
| 3,273,076 | 9/1966 | Wilting | 321—45 |

JOHN F. COUCH, *Primary Examiner.*

W. M. SHOOP, *Assistant Examiner.*